A. S. R. OVERHOLT.
NUT LOCK.
No. 246,810.
Patented Sept. 6, 1881.
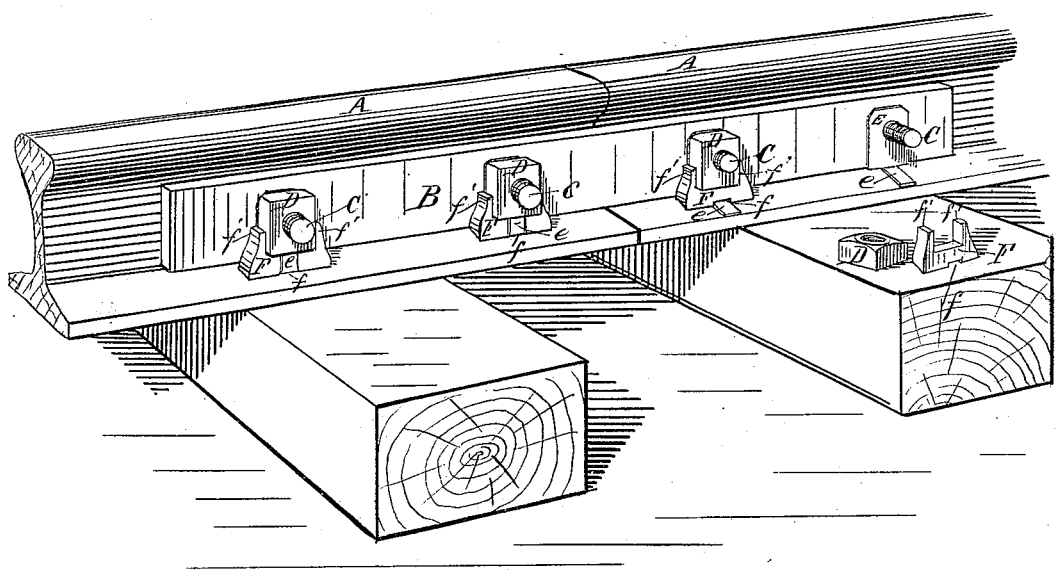

United States Patent Office.

AARON S. R. OVERHOLT, OF WEST OVERTON, PENNSYLVANIA.

NUT-LOCK.

SPECIFICATION forming part of Letters Patent No. 246,810, dated September 6, 1881.

Application filed January 27, 1879.

*To all whom it may concern:*

Be it known that I, AARON S. R. OVERHOLT, of West Overton, Westmoreland county, Pennsylvania, have invented a new and useful Improvement in Nut-Locks, which improvement is fully set forth in the following specification, reference being had to the accompanying drawing.

Similar letters of reference indicate corresponding parts.

The invention relates to a nut-locking device for fish-joints of railroad-rails; and it consists in the employment of a suitable gib-keeper formed to fit snugly into the recesses formed by the top of the rail-flange and the lower side of the nut and to clasp firmly the two sides of the nut, and also in a metallic tined washer, by which the gib-keeper is secured and maintained firmly in place within the recess in such manner as to effectually prevent the jarring out of the gib or the unscrewing and loosening of the nuts by the jar incident to the traffic upon the road, and to provide for the removal of the gib as occasion may require.

In the drawing, A A represent the contiguous rails of a railroad at the joint; B, one of the fish-plates, and C the bolts securing the fish-plates to the rails.

The fish-plates and bolts are of the form commonly used for such purpose, provided with square holes in the fish-plates and square shanks at the head end of the bolts, or other suitable means to prevent the bolts from turning when in position.

The nuts D of the bolts are of the ordinary square form. E is the tined washers, made of suitable ductile sheet metal and of such form as to come in position over the bolts between the fish-bar and the nuts, and to extend down to the top of the rail-flange, at which point a strip or tine, *e*, is formed as a part of the washer, which tine is bent outwardly in such manner as to rest on the rail-flange.

The gib F is formed of suitable shape to fit snugly between the lower side of the nut and the top of the rail-flange, and is formed with shoulders *f' f'* to fit and clasp the two sides of the nut, and is provided with a rabbet or notch on the under side thereof, suited to and to fit over the tine *e*. The tine *e*, being of suitable length for the purpose, is then bent upward and inward against the outer face of the gib, which serves to hold the gib securely in place between the nut and rail-flange, and in like manner by bending down the end of the tine the gib may be removed and the nut will be left free to be turned as desired.

I am aware that iron straps or bars provided with downwardly-projecting ends for and applied to locking a series of nuts for fish-joints are not new, nor is it new to provide washers with tines for the purpose of turning over the top of said iron straps or bars, whereby they are prevented from raising off the top of the nuts; but this form is objectionable, inasmuch as such construction is only applicable to a fish-joint or where a series of nuts can be used. This method is further objectionable, for the reason that should one of the turned-down ends of the bar break off by the jar or otherwise the remaining portion is liable to slip endwise from under the tine, thereby leaving the nuts and subjecting them to become loose and fall off by the jar to which the rails are subjected, and I therefore do not claim such.

By my improvement I am enabled to lock each nut independently by a single gib and tine. The nut is equally applicable to machines as well as railroad fish-joints. I take an ordinary gib and make a rabbet across its length on the side next its base, as shown, and in applying it I put on my washer, provided with a tine which fits into said rabbet, after the nut is screwed up in the usual way. I turn up the tine, thus holding the gib firmly in place. Should one or both of the gib ends break off, the nut is still tightly locked, as the remaining portion of the gib is firmly held in position by the tine fitting into the aforesaid rabbet, and therefore not liable to get loose or slip out.

I am aware a series of nuts have been locked by a bar resting on their upper sides and triangular washers whose upper ends were bent over said bar; but my invention is distinguished from such by the form of the gib, also by its location and manner of coaction with the nut and rail-flange, and, lastly, by the construction of the washer and its connection with the gib.

I do not broadly claim the washer having tines and the locking-bar as my invention; but What I do claim is—

The combination, with the rail A, bolt C, and nut D, of the gib F, which is wedged between the nut and rail-flange, and provided with shoulders $f'$ $f'$ and rabbet $f$, for the respective purposes specified, and the washer E, having tine $e$, which projects from its base and lies in the rabbet of said gib, as shown and described.

AARON S. R. OVERHOLT.

Witnesses:
   JOHN H. STEVENSON,
   SAMUEL E. REYNOLDS.